United States Patent [19]

Martinez-Lozano

[11] 3,996,960
[45] Dec. 14, 1976

[54] LIQUID LEVEL CONTROLLING VALVE

[76] Inventor: Federico Martinez-Lozano, Guayana Holandesa No. 350 Col. Vista Hermosa, Monterrey, N.L., Mexico

[22] Filed: Feb. 27, 1975

[21] Appl. No.: 553,767

[30] Foreign Application Priority Data

Oct. 2, 1974 Mexico .............................. 154122

[52] U.S. Cl. .............................. 137/451; 137/426; 137/444; 251/9
[51] Int. Cl.$^2$ ................... F16K 31/18; F16K 33/00
[58] Field of Search ................. 4/41; 137/434, 451, 137/426; 251/9

[56] References Cited
UNITED STATES PATENTS

| | | | |
|---|---|---|---|
| 1,208,274 | 12/1916 | Besler | 137/451 |
| 2,808,185 | 10/1957 | Norris et al. | 251/9 |
| 2,831,497 | 4/1958 | Skerritt | 137/451 |
| 3,508,574 | 4/1970 | Skerritt | 137/451 |

*Primary Examiner*—Martin P. Schwadron
*Assistant Examiner*—G. L. Walton
*Attorney, Agent, or Firm*—Ladas, Parry, Von Gehr, Goldsmith & Deschamps

[57] ABSTRACT

A control valve for liquid in stationary tanks, such as toilets humidifiers and the like, of the type housed within a tank, having an inlet orifice for water and an outlet orifice for the same, including a lever which actuates, by means of chain or cable, a sealing plug in said outlet orifice of said tank opening it to empty said tank and which includes a float connected to a rod which actuates a valve member for opening and closing the intake orifice of liquid into the tank, wherein a laminar support structure is connected to said inlet orifice for liquid into said tank a height adjustable bracket projecting from said support structure, a yoke supported on said bracket; a L-shaped elbow member being pivotally supported by its apex on said yoke one of the arms of said elbow member is connected to said rod joined to said float and the other of which arms having its bottom edge rounded in such a manner that when said tank is full it presses, against the bottom face of said yoke supported on said bracket; an elastic hose constituting in one end of same the entry for liquid into the tank; a second more rigid hose being connected in one end thereof to the other end of said first hose by means of an adapter and a clamp which holds said end of said second hose to said bracket in a very close position to said yoke; said first hose passing through said yoke between said rounded bottom edge of said elbow arm and said bottom face of said yoke said more rigid hose being connected to said inlet orifice for liquid into said tank by means of an adapter.

3 Claims, 6 Drawing Figures

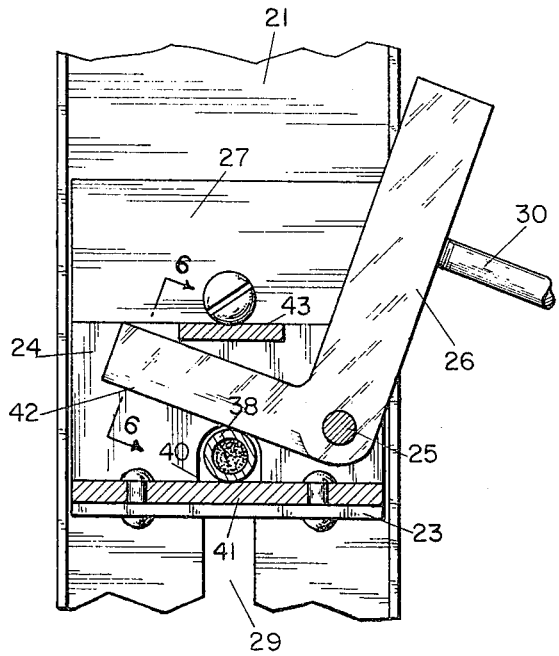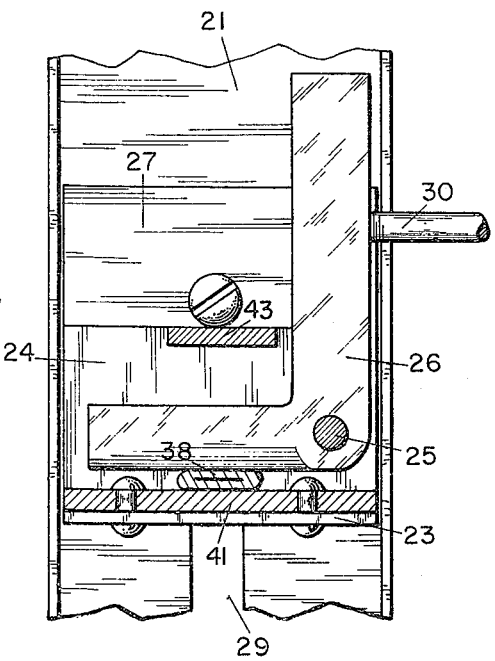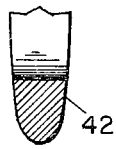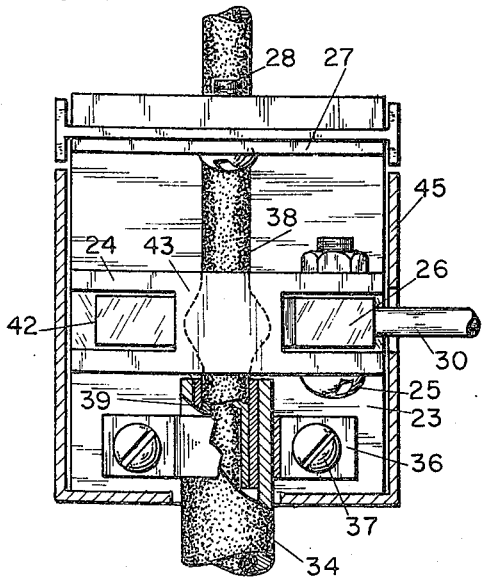
FIG. 3    FIG. 4
FIG. 6    FIG. 5

LIQUID LEVEL CONTROLLING VALVE

BACKGROUND OF THE INVENTION

This invention refers in general terms to valves for controlling the level of the liquid in stationary tanks and more particularly concerns to a valve for controlling the level of liquids in stationary tanks such as toilets, humidifiers and the like, which prevents leaks therein.

Normally, the best known valves in this field consist of a system of rocker arm and chain by means of which the movement of a manual lever joined to a cable or the like pulls a plug which obstructs the discharge orifice, causing the tank to empty; a float descends at the same time as the level of the liquid, opening an orifice for admitting liquid which permits the tank to refill as soon as the plug has been replaced and seals the outlet orifice. When the level of the liquid rises in the tank, the float returns to its initial position and by means of the rod to which it is attached it closes the inlet opening for liquid to enter the tank. This system also normally includes a vertical tube connected to the discharge and having its upper open end at a certain level in order to prevent the level of the liquid in the tank from rising higher than this tube which functions as an overflow.

Such systems are subject to an unlimited number of misfunctions; one of the most frequent consists in the plug not sealing hermetically the discharge orifice, either because of some sediment accumulated in the discharge orifice or merely because it was mispositioned through the failure of some guiding device. This causes considerable losses of liquid, which may have serious consequences due to the scarcity of the liquid especially in certain arid zones.

Another frequent misfunction of these systems, particularly in toilet tanks, is that the required quantity for a normal flushing is not obtained with the float at a certain level. The user normally applies an apparent solution to this problem by bending the rod which is connected to the float to allow the level of liquid in the tank to rise to a higher level. This operation weakens the threading or connection of the float with the rod and in reality generally increases number of problems in the system, sometimes causing the level of the water to rise higher than the overflow tube intake, thus producing a waste of the liquid, this time because of the higher level it reaches in the tank.

This last drawback can be summarized by saying that to date no systems have existed allowing an easy adjustment of the level of the liquid contents within the tank; another fundamental drawback of the conventional systems has been that because of the need for a strong hermetic seal at the intake orifice or feed line to the tank, the lever arm or rod connected to the float has has to be of such a length as precludes a compact width dimension for the tank.

To solve the problems above mentioned, which result essentially in a considerable loss of water, extremely sophisticated systems of cylindrical cams or the like have been devised requiring finishing with machine tools which increase production cost, this latter being the principal reason that they have not been able to supplant the traditional systems.

SUMMARY OF THE INVENTION

In view of the foregoing, it is an object of this invention to supply a control valve for the liquid level in stationary tanks, in which the liquid content can be adjusted by easily raising or lowering the valve.

Another object of this invention is to supply a liquid level control valve for stationary tanks in which the dimensions of the tank can be considerably reduced by reason of using a compound lever which multiplies the pressure applied by the float upon the closure element of the intake valve for liquid in the tank.

It is still another object of this invention to provide a liquid level control valve for stationary tanks in which the closure element of the intake valve is not composed of packing which requires maintenance because of its wear; furthermore, because of the simplicity of the component parts of the new valve of the present invention, the costs of production, installation and repair will all be considerably reduced.

These and other objects to be obtained through the application of this invention will be better understood and appreciated in the following description which refers to the accompanying drawing of the preferred embodiment of the invention.

BRIEF DESCRIPTION OF THE DRAWINGS

FIG. 3 is a detail view of the valve of the present invention, showing the valve closure mechanism which seals the feed orifice of water into the tank, in its open position, that is, when the float has gone down due to discharge from the stationary tank.

FIG. 4 is a view similar to FIG. 3, but showing the mechanism which closes the intake orifice for liquid into the tank in its compression or hermetically sealed position which corresponds to the situation in which the float is in its upper position, that is, when the liquid content of the tank has reached the upper level fixed for it.

FIG. 5 is an upper plan view detail showing the value mechanism in the same position as in FIG. 4, and with dotted lines the deformation produced in the conduit which feeds the liquid into the tank when the closure mechanism is in the valve closed position, that is when the level of the liquid content in the tank has reached its predetermined upper position.

FIG. 6 is a detail view in cross-section along 6—6 of FIG. 3, showing the rounded lower part of the closure mechanism, so shaped to avoid causing damage to the feed tube for water within the tank.

DETAILED DESCRIPTION OF THE INVENTION

Figure 1:
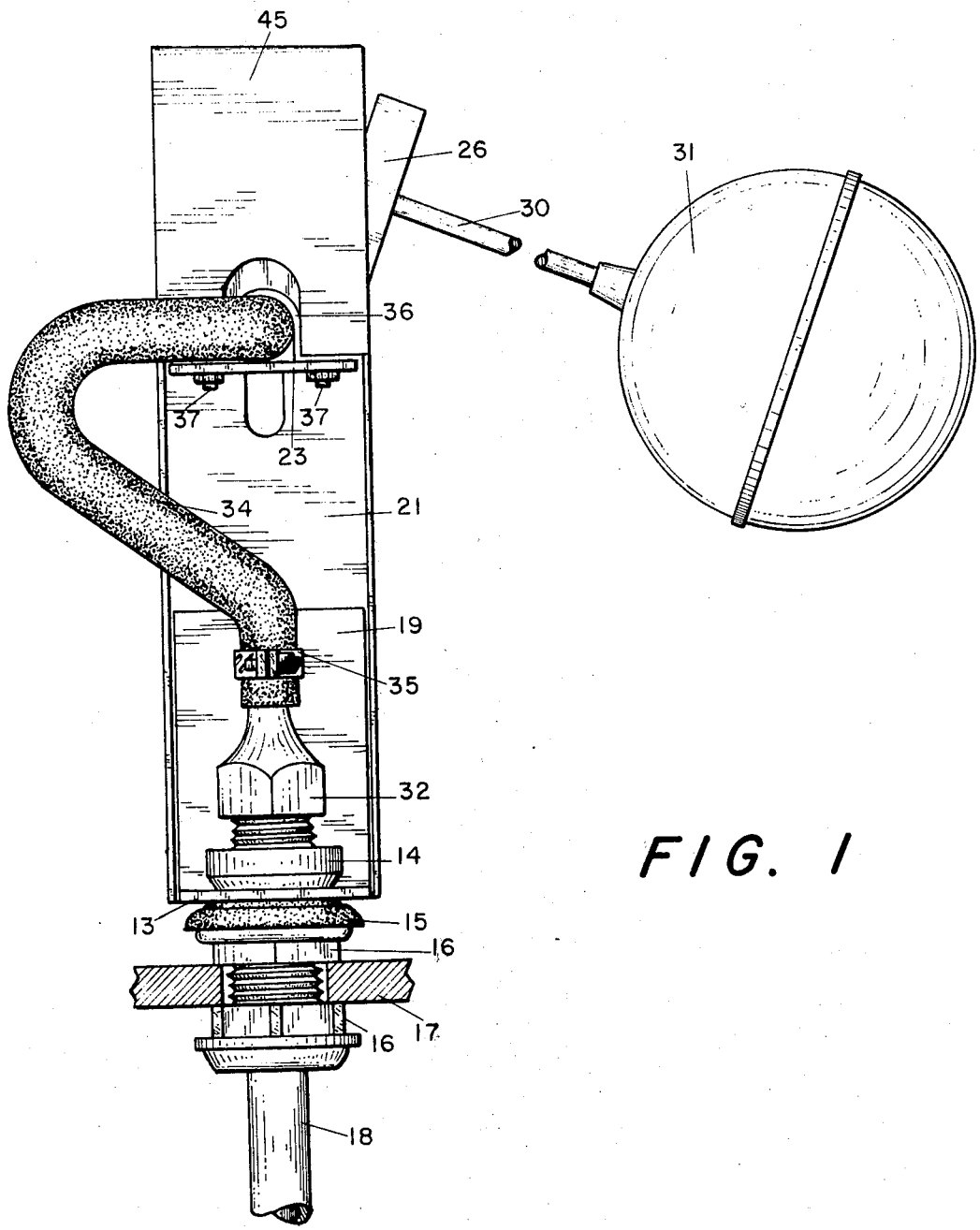
FIG. 1 is a view in vertical front elevation showing the control valve for liquid level in stationary tanks of the present invention, connected to the bottom of a stationary tank which is partially shown.

Referring to the drawings, the valve of the present invention for controlling the level of liquid in stationary tanks, such as toilet tanks and the like, is composed fundamentally of a support structure 11, composed of a laminar L-shaped plate 12 having one of its parts 13 seized between holding nut 14 and gasket 15, hermetically attached to a nozzle 16 which holds the mechanism to the bottom 17 of the wall of the tank in which the level liquid is to be controlled, allowing the entrance of liquid through conduit 18 outside the tank. The other portion 19 of the L-shaped laminar plate 12, perpendicular to part 13 seized between holding nut 14 and gasket 15, is secured by means of pins or screws 20 to an elongated plate 21 which rises vertically upward and which serves as support to another L-shaped laminar plate 22, which has one of its portions 23 as a bracket parallel to and spaced from lower portion 13 of the other laminar plate 12, and supports a yoke 24 located transversely to the plate 23, in which is pivotally supported, by its apex upon bolt or pin 25, a rocker arm or body 26 in a substantially L-shape, which constitutes the closure or sealing element of the valve. The other portion 27 of laminar plate 22 perpendicular to portion 23, which supports yoke 24, is secured to the said plate 21 by means of bolts or pins 28 which pass through elongated slots 29, thereby allowing the height or position at which L-shaped laminar plate 22 supports valve closing element 26 to be varied. The closure element or sealer 26 of the valve is connected by one of its arms to a rod 30 which is connected at its other end to float 31.

Holding nut 14 is threadedly connected to adapter 32 which has at its end a grooved surface 33 which allows the firm connection thereon of hose 34 of a thermoplastic material by means of clamp and pin 35 which are conventional. This hose 34 has adequate strength for the liquid pressure, so that even when the valve is its closed position said hose does not deform. The other end of hose 34 is connected by clamp 36 and bolts 37 to laminar plate 23 which serves as support for the yoke 24 on which valve closure element 26 oscillates. The end of hose 34 beyond clamp 36 being connected, as can be seen more clearly in FIG. 5, to another hose 38 which is more flexible and of less diameter by means of adapting sleeve 39, or by any similar disposition; said more flexible hose 38 passes through hole 40 on each side of yoke 24 and is supported on base 41 of said yoke and passes under the rounded end or edge 42 of L-shaped closure element 26 or valve sealer. Yoke 24, within which closure element or valve sealer 26 pivotally oscillates and rocks about pin 25, comprises at its upper portion a partial cover 43 which serves as stop to upper portion of element 42 the lower edge of which is rounded and is the sealing part of closure 26 of the valve, and limits the pivoting movement thereof. Finally the more flexible hose 38 is connected at its end to a hose or tube 44 for filling the tank, and the connection to the overflow pipe or any other desired application. The closure or sealing element of valve 26 can be hidden within a cover 45 hooked by fixing means 46 or in any other way to support structure 11 of the valve of the present invention.

Figure 2:
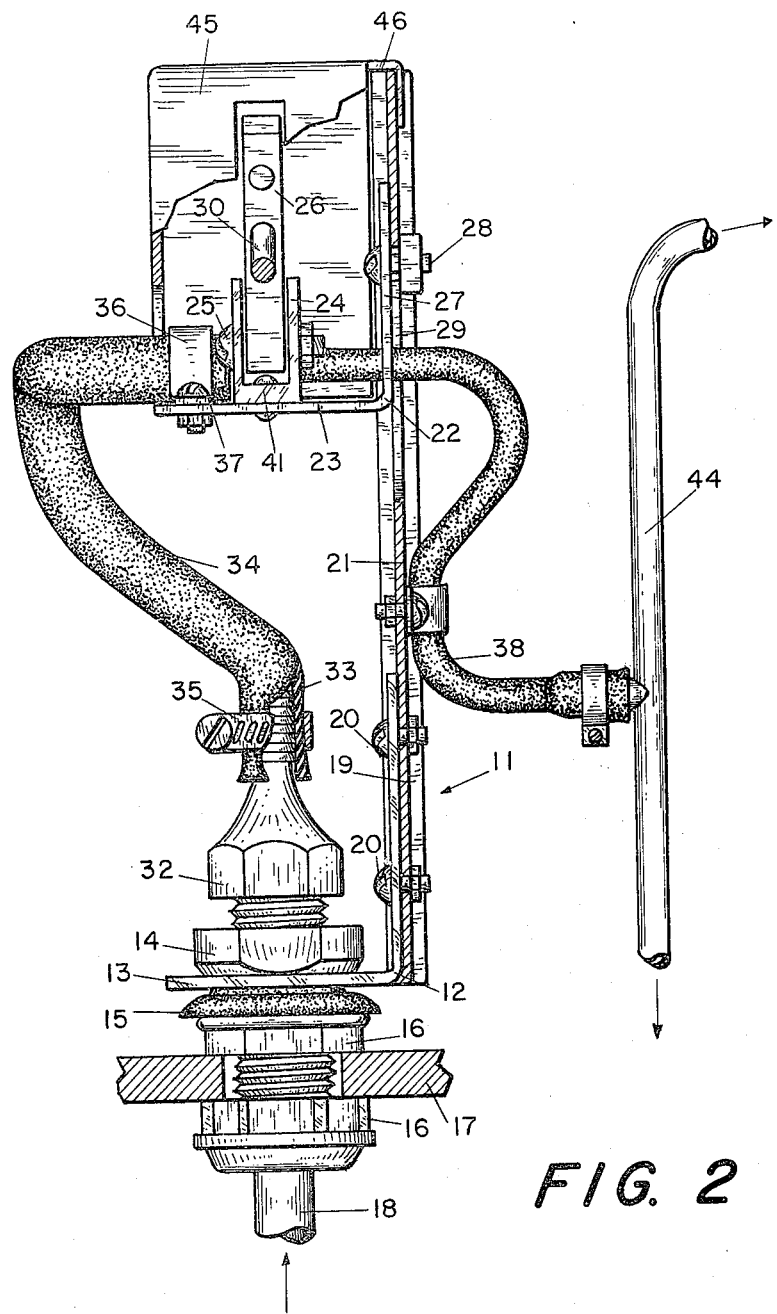
FIG. 2 is a view in vertical elevation similar to that of FIG. 1, except that it is taken from one of its sides in order to indicate more clearly the structural component aspects thereof.

From the foregoing it can be seen that once the tank to which the valve of the present invention is applied and of which only the bottom 17 is illustrated is emptied, water is fed in by entry conduit 18 as is indicatetd by the lower arrow of FIG. 2 and passes through hose 38 and enters the tank by conduit 44; progressively as the tank is being filled float 31 begins to rise, whereby L-shaped element 26 which is the closure of the valve begins to press against hose 38 until it reaches the position illustrated in FIG. 4, in which the rounded portion 42 of L-shaped mechanism 26 which closes the valve, presses this hose 38 against the bottom wall 41 of yoke 24, thus preventing the admission of water. Because this deformation or squeezing of more flexible tube 38 is effected at its connection with hose 39, secured with clamp 36, no deformation at all is produced by the pressure of the water.

Inversely, when the tank is emptied and float 31 goes down, the L-shaped sealing mechanism 26 turns pivotally about pin 25, allowing hose 38, because of its elasticity, to return to the position illustrated in FIG. 3, and permitting the tank to be filled again. Naturally the hoses, although they have been described as being of a flexible and thermoplastic material, can be of any other type which permits varying of fixing the level at which the valve closes, with no need for bending rod 30 which is connected to float 31.

Because valve sealing element 26 is elbow-shaped, the compound lever composed of this mechanism and rod 30 permit of reducing the width of the tank achieving greater force applied against the water admission elastic hose 38.

While the foregoing description is drawn to the preferred embodiment of the invention, it will be understood by those skill in the art that the foregoing description, as well as any modification in form or detail, such as unitary construction of certain parts or the changing of the material of hoses and tubes is included within the scope and spirit of this invention.

I claim:
1. A liquid level controlling valve for stationary tanks, such as toilets, humidifiers and the like, comprising:
   a flexible liquid inlet pipe;
   a flexible hose having one end coupled in liquid tight manner to one end of said flexible liquid inlet pipe;
   a supporting structure supporting said flexible hose and provided with a base portion for mounting said supporting structure within a tank;
   a valve closure member supported by said supporting structure so as to be pivotable in one direction to clamp the flexible hose to close off flow of liquid therethrough and in the opposite direction to release the flexible hose and permit flow of liquid therethrough;
   a float;
   a substantially rigid member coupling said float mechanically to said valve closure member so that on raising of said float the valve closure member pivots in said one direction and on lowering of said float the valve closure member is permitted to pivot in said opposite direction; and
   means connecting said supporting structure to said base portion in such manner as to enable the height of the supporting structure with respect to the base portion to be varied

2. A liquid level controlling valve as claimed in claim 1, further comprising a bifurcated outlet pipe having one end coupled in liquid tight manner to the other end of said flexible hose.

3. In combination a stationary tank and a liquid level controlling valve comprising:
   a flexible liquid inlet pipe; a flexible hose having one end coupled in liquid tight manner to one end of said flexible liquid inlet pipe;
   a supporting structure supporting said flexible hose and provided with a base portion for mounting said supporting structure within a tank;
   a valve closure member supported by said supporting structure so as to be pivotable in one direction to clamp the flexible hose to close off flow of liquid therethrough and in the opposite direction to release the flexible hose and permit flow of liquid therethrough;
   a float;

a substantially rigid member coupling said float mechanically to said valve closure member so that on raising of said float the valve closure member pivots in said one direction and on lowering of said float the valve closure member is permitted to pivot in said opposite direction; and means connecting said supporting structure to said base portion in such manner as to enable the height of the supporting structure with respect to the base portion to be varied, and wherein said valve is located within the tank with said base portion secured to a wall portion of the tank, said tank is fitted with a liquid inlet fitting, and the other end of said flexible liquid inlet pipe is coupled in liquid tight manner to said liquid inlet fitting.

* * * * *